United States Patent
Rhody et al.

(10) Patent No.: US 6,516,595 B2
(45) Date of Patent: Feb. 11, 2003

(54) HARVESTING MACHINE HAVING AN OBSTACLE SENSING DEVICE

(75) Inventors: Karl-Thomas Rhody, Boostedt (DE); Helmut Franke, Harsewinkel (DE)

(73) Assignee: CLAAS Industrietechnik GmbH, Paderborn (DE)

( * ) Notice: Subject to any disclaimer, the term of this patent is extended or adjusted under 35 U.S.C. 154(b) by 0 days.

(21) Appl. No.: 09/725,545

(22) Filed: Nov. 29, 2000

(65) Prior Publication Data

US 2001/0002533 A1 Jun. 7, 2001

(30) Foreign Application Priority Data

Dec. 3, 1999 (DE) .......................................... 199 58 341

(51) Int. Cl.$^7$ ........................... A01D 41/14; A01B 63/11
(52) U.S. Cl. .............................. 56/10.2 E; 56/DIG. 10; 172/4
(58) Field of Search ........................... 172/2, 3, 4, 4.5, 172/5, 7, 8; 56/10.2 E, DIG. 11, 10.2 R, 208, DIG. 10, DIG. 15; 91/437; 60/468, 417; 37/348

(56) References Cited

U.S. PATENT DOCUMENTS

| 5,331,882 A | * | 7/1994 | Miller ........................ 91/461 |
| 5,333,533 A | * | 8/1994 | Hosseini ..................... 91/361 |
| 5,477,677 A | * | 12/1995 | Krnavek ..................... 60/417 |
| 5,613,352 A | * | 3/1997 | Panoushek et al. ......... 56/10.2 E |
| 5,992,146 A | * | 11/1999 | Hausman .................... 60/413 |
| 6,035,943 A | * | 3/2000 | Gerein et al. ............... 172/328 |
| 6,085,501 A | * | 7/2000 | Walch et al. ............... 56/10.2 E |
| 6,151,874 A | * | 11/2000 | Eis ............................ 56/10.2 E |
| 6,173,639 B1 | * | 1/2001 | A'Hearn et al. ............. 91/437 |
| 6,186,044 B1 | * | 2/2001 | Hajek, Jr. et al. ........... 91/437 |
| 6,202,395 B1 | * | 3/2001 | Gramm ...................... 56/10.2 E |
| 6,354,790 B1 | * | 3/2002 | Cummings et al. ......... 414/729 |

FOREIGN PATENT DOCUMENTS

JP          3036333       * 2/1991

* cited by examiner

Primary Examiner—Thomas B. Will
Assistant Examiner—Nathan Mammen
(74) Attorney, Agent, or Firm—Husch & Eppenberger, LLC; Robert E. Muir; Richard J. Musgrave

(57) ABSTRACT

A harvesting machine with a front-mounted harvesting attachment that is pivotable about a shaft running transversely to the direction of travel comprising and capable of lifting when an obstacle is detected that includes a sensing device with at least one double-acting hydraulic piston and cylinder unit, having a first cylinder chamber and a second cylinder chamber, arranged on the harvesting attachment, a control valve associated with the sensing device in such a way that when the sensing device is not operated, the first cylinder chamber is in fluid communication with the second cylinder chamber by a control valve and when the sensing device is operated, fluid communication between the first cylinder chamber and the second cylinder chamber is interrupted by the control valve.

12 Claims, 2 Drawing Sheets

HARVESTING MACHINE HAVING AN OBSTACLE SENSING DEVICE

BACKGROUND OF THE INVENTION

There are combine harvesters in which the cutterbar assembly can be lifted and lowered by means of two single-acting hydraulic piston and cylinder units. To lift the harvesting attachment, the two cylinder chambers of the hydraulic piston and cylinder units on the piston face side admit oil, whereas during the lowering operation the piston rods are retracted simply by the weight of the cutterbar assembly. When working in the field, the cutterbar assembly is adjusted in such a way that the finger bar has a predetermined distance from soil in a field. Additional spring assemblies assist the hydraulic piston and cylinder units and allow a certain springing of the cutterbar assembly when used in the field. In their front region, the known cutterbar assemblies have sensing devices by which an electromagnetic control valve is switched on for detection of an obstacle in such a way that the two cylinder chambers on the piston face side admit oil in order to lift the cutterbar assembly above the obstacle. This known manner of lifting a cutterbar assembly has the drawback that, if obstacles occur suddenly, the assembly cannot be lifted out of the way quickly enough. This is due to the fact that in order to carry out rapid lifting, a very large oil stream must be suddenly provided, however, the quantity of oil, which is absolutely required is relatively small in this case. The risk of not being able to lift the cutterbar assembly quickly enough when obstacles arise increases in relationship to the travelling speed of the combine harvester.

SUMMARY OF THE INVENTION

In an aspect of this invention, a harvesting machine with a front-mounted harvesting attachment that is pivotable about a shaft running transversely to the direction of travel and capable of lifting when an obstacle is detected is disclosed. This apparatus includes a sensing device with at least one double-acting hydraulic piston and cylinder unit, having a first cylinder chamber and a second cylinder chamber, arranged on the harvesting attachment, a control valve associated with the sensing device in such a way that when the sensing device is not operated, the first cylinder chamber is in fluid communication with the second cylinder chamber by a control valve and when the sensing device is operated, fluid communication between the first cylinder chamber and the second cylinder chamber is interrupted by the control valve.

In another aspect of this invention, a method for lifting a front-mounted harvesting attachment that is pivotable about a shaft running transversely to the direction of travel when an obstacle is detected is disclosed. The method includes operating a control valve associated with a sensing device, with at least one double-acting hydraulic piston and cylinder unit, having a first cylinder chamber and a second cylinder chamber, arranged on the harvesting attachment in such a way that when the sensing device is not operated, the first cylinder chamber is in fluid communication with the second cylinder chamber by a control valve and when the sensing device is operated, fluid communication between the first cylinder chamber and the second cylinder chamber is interrupted by the control, valve.

Some of the advantages of this invention, but not all by any means, are achieved according to the invention by the fact that the hydraulic piston and cylinder unit is double-acting and, when the sensing device is not operated, the first cylinder chamber on the piston face side communicates with the second cylinder chamber on the piston rod side by the control valve via lines, wherein between the second chamber of the cylinder on the piston side and the electromagnetic control valve is provided an accumulator and, when the sensing device is operated, the communication between the first and second cylinder chambers is interrupted by the control valve with the second chamber of the cylinder on the piston rod side connected to a tank. Advantageously, in this case, the accumulator in the pressurized state contains at least the quantity of oil needed for the necessary extension of the piston rod of the hydraulic piston and cylinder unit.

This solution has the advantage that there are no extra spring assembles required because, when the first and second cylinder chambers are short-circuited with each other during use, the accumulator can function as a spring assembly. But an additional advantage lies in that the whole system is pressurized so that when the communication between the two cylinder chambers is interrupted, on account of the variation in surface conditions, there is a sudden increase in power because only the first cylinder chamber on the piston face side is subjected to the pressure applied, while the oil which is in the second cylinder chamber on the piston rod side can flow back without pressure to the tank. Consequently, a cutterbar assembly is lifted after detection of an obstacle immediately and without delay.

These advantages are not to be construed as all-inclusive, but are just many of innumerable advantages associated with the present invention.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

Figure 1:
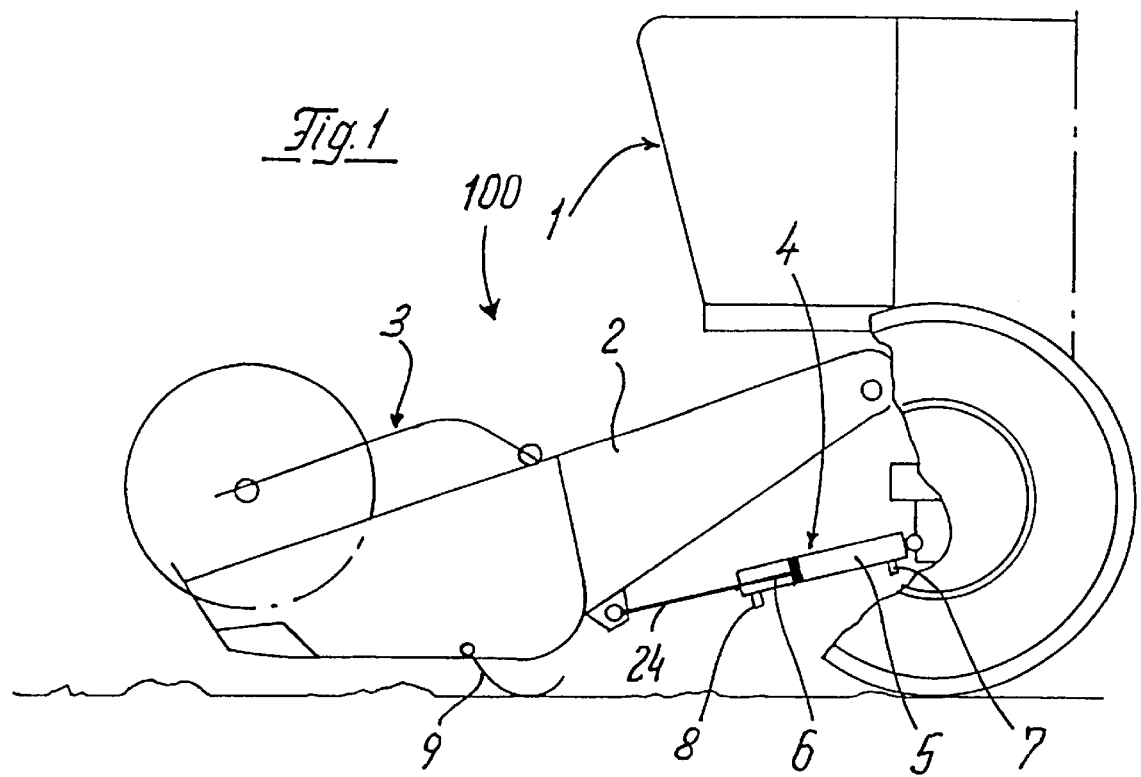
FIG. 1 is a side elevational view of a front portion of a combine harvester with a cutterbar assembly and a sensing device of the present invention.

Referring now to FIG. 1, a combine harvester is generally indicated by numeral 100. This combine harvester 100 is preferably, but not necessarily, self-propelled. The front of the combine harvester 100 has a feed rake 2 to which is attached a cutterbar assembly 3. The cutterbar assembly 3 can be lifted and lowered by a piston 24 associated with a double-acting hydraulic piston and cylinder unit 4 so that both a first cylinder chamber 5 on the piston face side and a second cylinder chamber 6 on the piston rod side have line connections 7 and 8, respectively. It can also be seen from FIG. 1, that the cutterbar assembly 3 has a sensing device 9 in the front region of the combine harvester 100.

Figure 2:
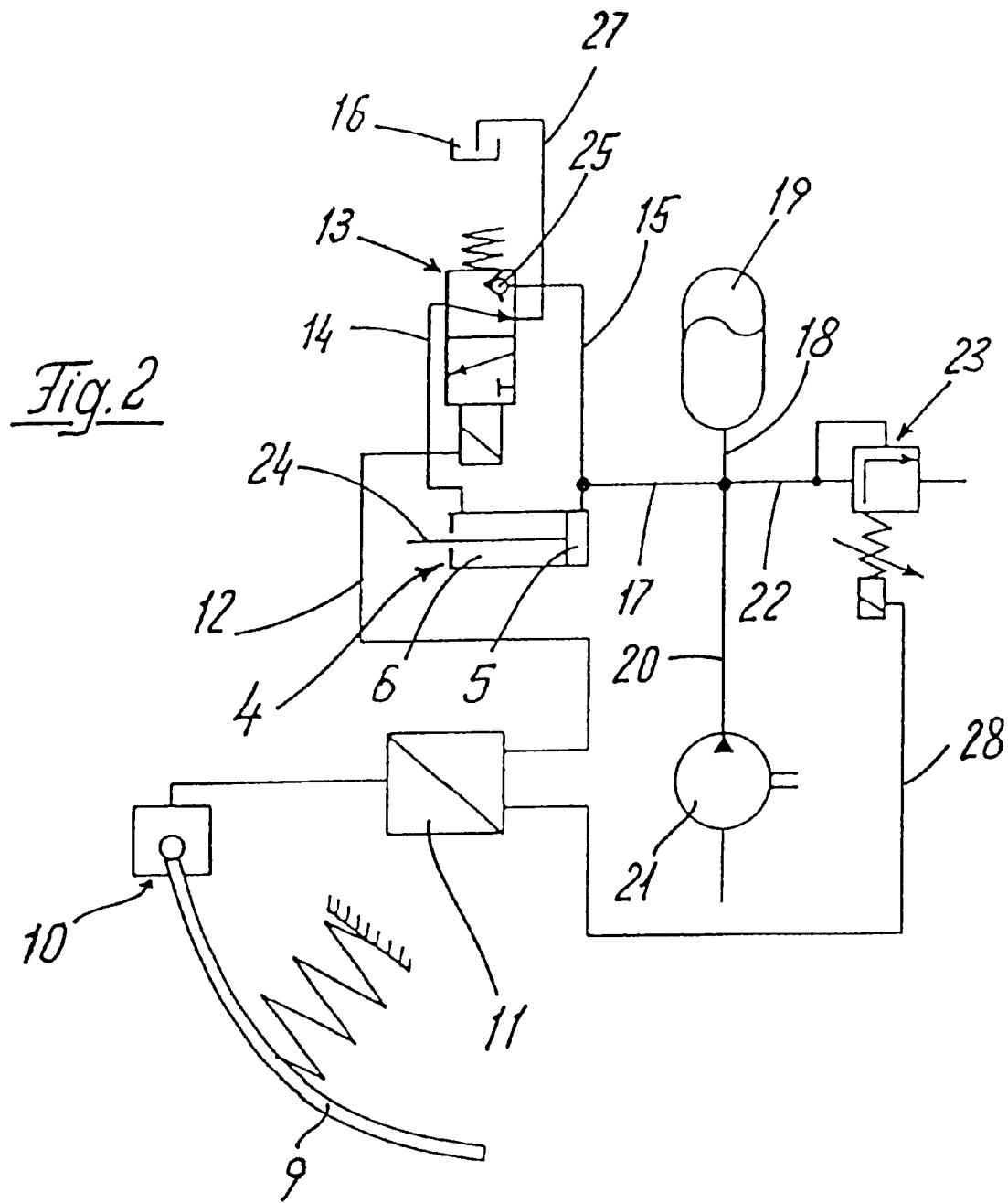
FIG. 2 is a schematic circuit diagram for carrying out an operation of lifting the cutterbar assembly according to FIG. 1.

Referring now to FIG. 2, the sensing device 9 is connected to a sensor 10 whose signals are converted by a converter 11 to electrical signals which are then fed via an electrical signal line 12 to an electro-mechanical control valve 13. This electro-mechanical control valve 13 is connected by a line 14 to the second cylinder chamber 6 on the piston rod side of the hydraulic piston and cylinder unit 4. Also, the first cylinder chamber 5 on the piston face side is connected by a line 15 to the electro-mechanical control valve 13. The electro-mechanical control valve 13 has a further connection via line 27 to a tank 16. Line 15 branches off to a line 17 where line 17 is connected to an accumulator 19 via line 18 and a pump 21 is connected to line 17 by a line 20. Line 17 is also connected to overpressure value 23 through a line 22. Also, the signals from the sensing device 9 that is connected to a sensor 10 are converted by a converter 11 to electrical signals which are then fed via an electrical signal line 28 to the overpressure valve 23. As shown in FIG. 2, the sensing device 9, the sensor 10, the converter 11, the electrical signal line 12, the electro-mechanical control valve 13, the electrical signal line 28, and the overpressure valve 23 form a simple electrical circuit. The electrical circuit provides a simple, cost-effective means for rapidly responding to detection of an object without digital computation.

In the switch position of the electro-mechanical control valve 13, shown in FIG. 2, the second cylinder chamber 6 on the side of the piston rod 24 of the hydraulic piston and cylinder unit 4 is connected to the tank 16 via line 14 through the electro-mechanical control valve 13 and then through line 27. The first cylinder chamber 5 on the piston face side is directly connected by the lines 17 and 18, respectively, to the accumulator 19. This position of the electro-mechanical control valve 13 is occupied when the sensing device 9 detects an obstacle. The quantity of oil available in the accumulator 19 then suddenly expels the piston rod 24, with the result that the cutterbar assembly 3 to which the piston rod 24 is connected is directly lifted. In this case, a non-return valve 25 prevents oil from running away through the line 15. After passing over an obstacle, the sensing device 9 pivots back to its starting position, with the result that the electro-mechanical control valve 13 is switched in such a way that the two lines 14 and 15 are short-circuited. The first cylinder chamber 5 on the piston face side is then connected to the second cylinder chamber 6 on the piston rod side, so that the piston rod 24 is moved back by the weight of the cutterbar assembly 3 and the accumulator 19 is filled.

What is claimed is:

1. A harvesting machine with front-mounted harvesting attachment that is pivotable about a shaft running transversely to the direction of travel and capable of lifting when an obstacle is detected comprising:
   an overpressure valve;
   a control valve;
   an electrical circuit including a sensing device and electrical signal lines connected to the overpressure valve and the control valve;
   at least one double-acting hydraulic piston and cylinder unit operatively connected to the control valve, having a first cylinder chamber and a second cylinder chamber, arranged on the harvesting attachment; and
   a hydraulic fluid storage tank operatively connected to the control valve; and
   wherein the control valve is associated with the sensing device in such a way that:
      when the sensing device is not operated, the first cylinder chamber is in fluid communication with the second cylinder chamber by the control valve; and
      when the sensing device is operated, fluid communication between the first cylinder chamber and the second cylinder chamber is interrupted by the control valve and the second cylinder chamber is in fluid communication with the storage tank.

2. The harvesting machine according to claim 1, wherein the first cylinder chamber is in fluid communication with the control valve through at least one fluid line.

3. The harvesting machine according to claim 1, further includes an accumulator located between the first cylinder chamber and the control valve.

4. The harvesting machine according to claim 3, wherein the accumulator in the pressurized state contains at least a quantity of oil needed for an extension of a piston rod associated with the at least one double-acting hydraulic piston and cylinder unit.

5. The harvesting machine according to claim 3, further includes a pump that is in fluid connection with the accumulator.

6. The harvesting machine according to claim 3, wherein the overpressure valve is in fluid connection with the accumulator.

7. The harvesting machine according to claim 1, wherein the tank is located between the second cylinder chamber and the control valve.

8. The harvesting machine according to claim 1, wherein the sensing device includes a sensor.

9. The harvesting machine according to claim 1, further includes a cutterbar assembly associated with the harvesting attachment that is operably attached to a piston associated with the at least one double-acting hydraulic piston and cylinder unit.

10. The harvesting machine according to claim 1, further includes a non-return valve associated with the control valve.

11. A harvesting machine with a front-mounted harvesting attachment that is pivotable about a shaft running transversely to the direction of travel and capable of lifting when an obstacle is detected comprising:
    an overpressure valve;
    a control valve;
    an electrical circuit including a sensing device and electrical signal lines connected to the overpressure valve and the control valve;
    at least one double-acting hydraulic piston and cylinder unit, having a first cylinder chamber and a second cylinder chamber, arranged on the harvesting attachment;
    an accumulator located between the first cylinder chamber and the control valve and in fluid communication therewith; and
    a hydraulic fluid storage tank operatively connected to the hydraulic piston and cylinder unit; and
    wherein the control valve is associated with the sensing device in such a way that:
       when the sensing device is not operated, the first cylinder chamber is in fluid communication with the second cylinder chamber by the control valve; and
       when the sensing device is operated, fluid communication between the first cylinder chamber and the second cylinder chamber is interrupted by the control valve and the second cylinder chamber is in fluid communication with the storage tank.

12. The harvesting machine according to claim 11, wherein the sensing device is not operated immediately after passing over an obstacle such that the hydraulic piston is displaced by the weight of the cutterbar assembly and the accumulator is thereby filled.

* * * * *